United States Patent [19]

Beers et al.

[11] Patent Number: 5,259,537
[45] Date of Patent: Nov. 9, 1993

[54] SINGLE DOSAGE SUBSTANCE DISPENSER

[75] Inventors: Howard L. Beers; Alvin L. Waltman, both of North Fort Myers, Fla.

[73] Assignee: HF Scientific, Inc., Fort Myers, Fla.

[21] Appl. No.: 850,047

[22] Filed: Mar. 12, 1992

[51] Int. Cl.⁵ ............................................. G01F 11/14
[52] U.S. Cl. ...................... 222/246; 222/365
[58] Field of Search ............................... 222/246, 365

[56] References Cited

U.S. PATENT DOCUMENTS

| | | | |
|---|---|---|---|
| 1,303,141 | 5/1919 | Younger | 222/365 X |
| 1,637,189 | 7/1927 | Helberger | 222/246 X |
| 2,121,878 | 6/1938 | Locker | 222/365 X |
| 3,823,853 | 7/1974 | Alden | 222/365 |

FOREIGN PATENT DOCUMENTS

| | | | |
|---|---|---|---|
| 1803421 | 1/1978 | Fed. Rep. of Germany | 222/365 |
| 450298 | 7/1949 | Italy | 222/365 |

*Primary Examiner*—Gregory L. Huson
*Attorney, Agent, or Firm*—William E. Noonan

[57] ABSTRACT

A single dosage substance dispenser is disclosed, which includes a housing having a chamber formed therein for holding a substance to be dispensed and a discharge port that communicates with the chamber. A plunger is slidably mounted to the housing for extending through the chamber and into the discharge port. The plunger includes a first seal portion proximate a lower end thereof, a second seal portion disposed above the first seal portion and a receptacle portion located between the first and second seal portions for accommodating a single dosage of the substance to be dispensed. The first and second seal portions are sealably and slidably engageable with the discharge port. A spring is provided for urging the plunger to retract so that the first seal portion engages the discharge port and the receptacle portion is maintained in the chamber to collect the single dosage therefrom. The spring also permits the plunger to be advanced so that the second seal portion engages the discharge port and the receptacle portion is driven beyond the discharge port to dispense the single dosage collected from the chamber.

12 Claims, 2 Drawing Sheets

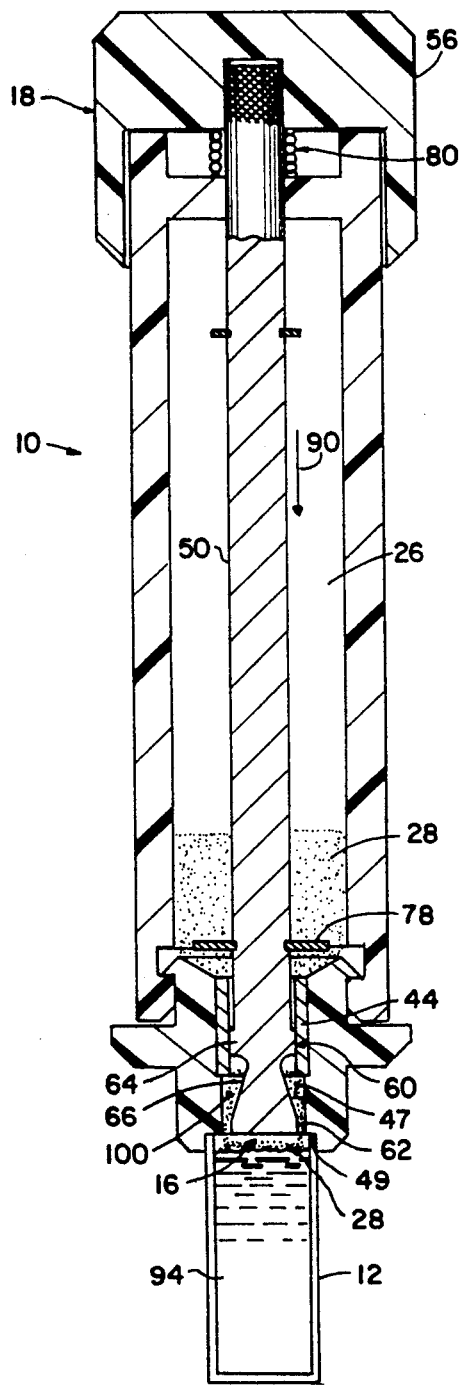
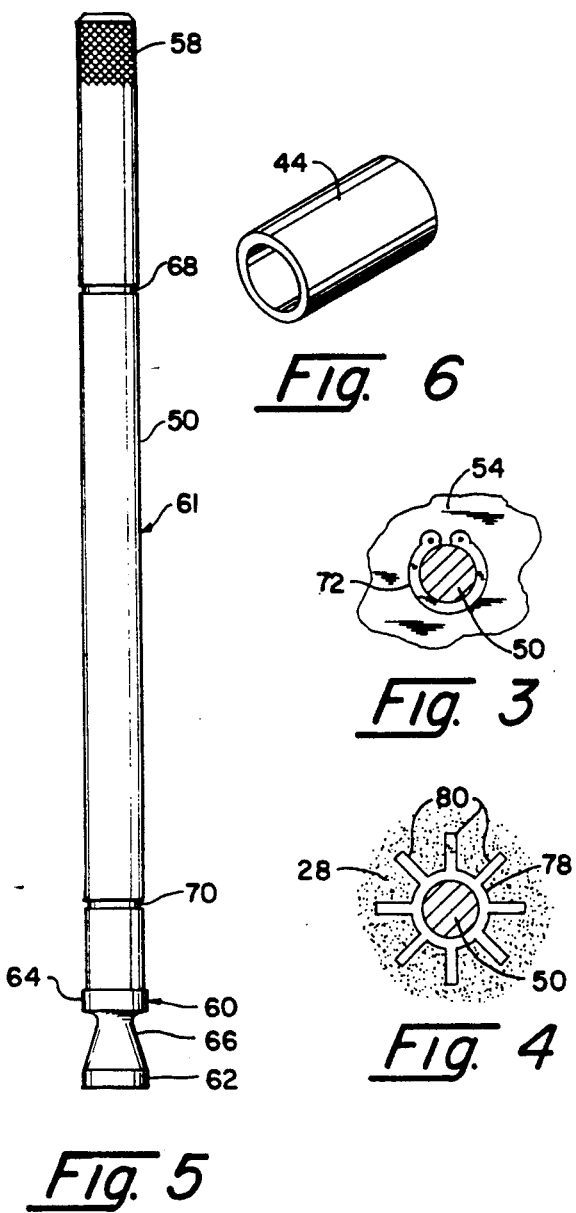
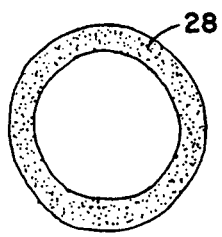

SINGLE DOSAGE SUBSTANCE DISPENSER

FIELD OF THE INVENTION

This invention relates to a single dosage substance dispenser and, more particularly, to a device that is suitable for dispensing powdered chemical reagents used in photometric analysis.

BACKGROUND OF THE INVENTION

Powdered chemical reagents are widely employed in the photometric testing of water for constituent chemicals such as chlorine. Conventionally, a precisely predetermined amount of reagent is added to a test sample of water so that it turns a certain hue, which depends upon the concentration of the constituent element in question. This sample is then tested by a photometer, such as in the manner described by my prior U.S. Pat. No. 5,083,036, to determine the concentration of the constituent element in the test sample.

Using a correct amount of reagent is critical to the effectiveness of these photometric tests. Therefore, a number of packaging schemes have been devised which allow the tester to dispense an accurately premeasured dosage for each test. However, each of these has disadvantages. For example, each individual dosage of reagent may be supplied in a plastic vial having a flexibly attached cover. Although such containers are fairly convenient to use, they are also quite expensive. Alternatively, the premeasured dosages of reagent have been packaged in various types of foil packets and plastic "pillows". These containers are less expensive than vials. However, opening them and dispensing the reagent into the sample tends to be a relatively awkward and time consuming procedure. The tester usually must use both hands and often requires a cutting implement to open the package. All of these known products require the tester to store, monitor and handle numerous individual reagent containers.

Although various substance dispensers are known in other arts, none is optimally suited for use in dispensing reagents for photometric analysis. In particular, most conventional dispensers employ a rotary mechanism, which again requires that the tester employ both hands to dispense the substance. This increases the time and tedium associated with the testing, which can lead to mistakes and erroneous results.

SUMMARY OF THE INVENTION

Accordingly, it is an object of this invention to provide an improved hand-held dispenser that quickly and conveniently dispenses a precisely measured single dosage of a substance as required.

It is a further object of this invention to provide a single dosage substance dispenser that holds a large number of dosages of the substance to be dispensed and that may be operated repeatedly and reliably to deliver accurately measured dosages of that substance.

It is a further object of this invention to provide a single dosage substance dispenser that eliminates the time, expense, inconvenience and other disadvantages associated with conventional single dosage packages and containers.

It is a further object of this invention to provide a single dosage substance dispenser that effectively resists atmospheric intrusion so that the stored substance is maintained for lengthy periods in a fresh, operable condition.

It is a further object of this invention to provide a single dosage substance dispenser that is lightweight, compact and easy to use in the field or in the laboratory.

It is a further object of this invention to provide a single dosage substance dispenser that is particularly well suited for use in dispensing powdered chemical reagents for use in photometric testing.

It is a further object of this invention to provide a single dosage substance dispenser that may be quickly and accurately positioned over a test liquid.

This invention features a single dosage substance dispenser including a housing having a chamber formed therein for holding a substance to be dispensed and a discharge port formed into the chamber. A plunger is slidably mounted to the housing for extending through the chamber and into the discharge port. The plunger includes a first seal portion proximate a lower end thereof, a second seal portion disposed above the first seal portion and a receptacle portion located between the first and second seal portions for accommodating a single dosage of the substance to be dispensed. The first and second seal portions are sealably and slidably engageable with the discharge port. There are spring means for urging the plunger to retract so that the first seal portion engages the discharge port and the receptacle portion is maintained in the chamber to collect the single dosage therefrom. The spring means also permit the plunger to be advanced so that the second seal portion engages the discharge port and the receptacle portion is driven beyond the discharge port to dispense the single dosage collected from the chamber.

In a preferred embodiment the housing has a generally cylindrical shape. The housing may also include a lower end having a channel that communicates with and is wider than the discharge port. The discharge port may include a substantially cylindrical element that communicably interconnects the chamber and the channel. The channel may include an enlarged portion for engaging a holder of a test liquid and centering the discharge port over the holder.

The plunger may include an engagement portion and an elongate shaft having an upper section that is attached to the engagement portion and a lower section for carrying the first and second seal portions and the receptacle portion. Preferably, the first and second seal portions are integrally interconnected and have substantially cylindrical outer surfaces. The receptacle portion may include a generally annular concave surface and that surface may be smoothly curved between the first and second seal portions. The spring means may include a helical compression spring disposed about the plunger shaft and extending between the housing and the engagement portion of the plunger.

An agitator element may be attached to the plunger within the chamber for agitating the substance therein as the plunger is retracted and advanced in the chamber. A stop element may also be attached to the shaft within the chamber for restricting removal of the plunger from the housing. A closure may be selectively engaged with the housing to cover the discharge port.

DETAILED DESCRIPTION OF PREFERRED EMBODIMENT

Other objects, features and advantages will occur from the following description of a preferred embodiment and the accompanying drawings in which:

FIG. 3 is a cross sectional view taken along line 3—3 of FIG. 2;

FIG. 4 is a cross sectional view taken along line 4—4 of FIG. 2;

FIG. 5 is an elevational side view of the plunger;

FIG. 6 is a perspective view of the cylindrical insert element utilized in the discharge port;

FIG. 7 is a cross sectional view, similar to that of FIG. 2, which illustrates the dispenser with the plunger in the extended condition for delivering a single dosage of reagent to a test cuvette; and FIG. 8 is a plan view of a single dosage of powdered material delivered by the dispenser onto a flat surface.

Figure 1:
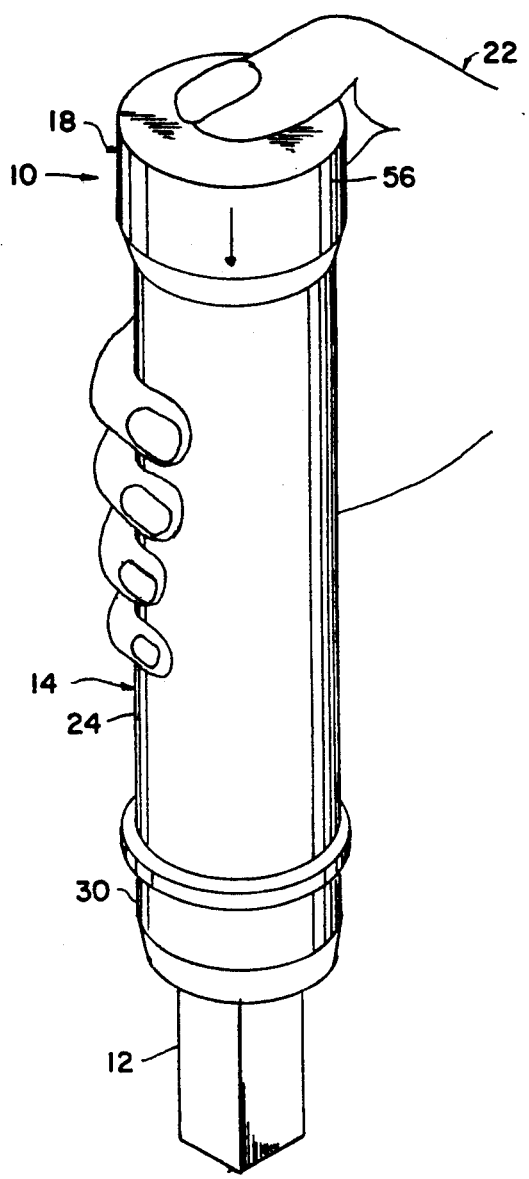
FIG. 1 is a perspective view of the dispenser of this apparatus being used to deliver a single dosage of reagent to a test sample cuvette for use in photometric testing.

There is shown in FIG. 1 a single dosage dispenser 10 that is positioned above and engaged with a cuvette 12. The cuvette holds a test sample of liquid such as water. Dispenser 10 is operated, as described below, to deliver a single dosage of reagent to cuvette 12 so that the test sample may be photometrically tested in a known manner.

Dispenser 10 includes a generally cylindrical housing 14, which holds multiple dosages of the reagent to be dispensed. The lower end of housing 14 includes a channel that engages the upper, open end of cuvette 12 in a manner shown and described below. A plunger 18 is slidably mounted to the opposite upper end of housing 14. To dispense a single dosage of reagent into cuvette 12, a tester 22 grasps the housing in one hand and presses down on plunger 18 with his or her thumb.

Figure 2:
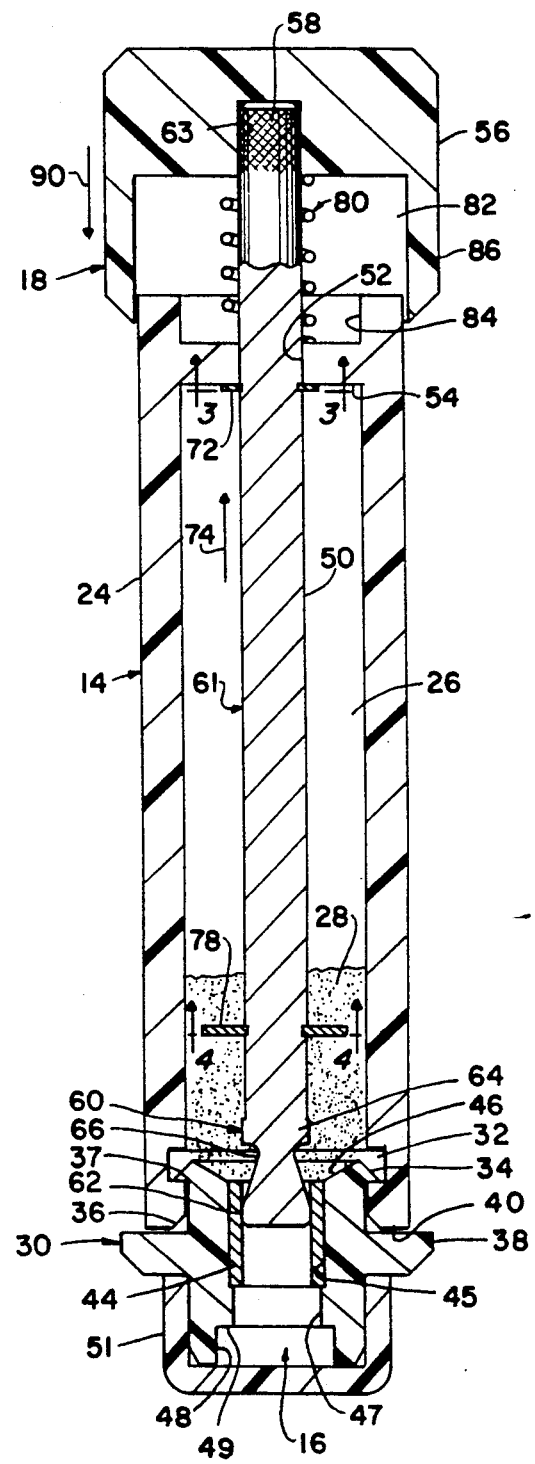
FIG. 2 is an elevational cross sectional view of the dispenser in the retracted condition with a closure covering the discharge port.

As shown in FIG. 2, housing 14 includes an elongate, generally tubular piece 24 having an interior chamber 26 for holding the reagent 28 or some other substance to be dispensed. Housing 14 also includes a generally annular insert piece 30 that is secured to the lower open end of piece 24. Preferably, both piece 24 and piece 30 are composed of a rugged yet somewhat resilient material such as polypropylene, although in other embodiments various alternative materials may be utilized. It is also preferred that such material be opaque so that the powdered substance may be stored in the chamber for extended periods of time without deteriorating. Piece 24 includes an annular interior groove 32 and piece 30 includes an annular lip 34 that is received in groove 32 to prevent separation of pieces 24 and 30. The lower end of piece 24 includes a chamfered entrance 36 leading into chamber 26. The leading edge 37 of flange 34 is likewise chamfered. As a result, the insert piece 30 is conveniently engaged with and snap fit onto piece 24. Piece 30 also includes a relatively large diameter annular flange portion 38 that engages the lower edge 40 of piece 24. It should be noted that although the housing is described as having two pieces, in other embodiments a single piece or other numbers of pieces may form the housing and various constructions may be employed.

A generally axial channel 16 is formed through piece 30. Channel 16 includes a generally funnel shaped entrance portion 46 that defines the bottom of chamber 28. The channel further includes upper cylindrical portion 45, within which is mounted a discharge port comprising a substantially cylindrical element 44, shown alone in FIG. 6. Element 44 is composed of stainless steel or similar material and is preferably permanently secured to piece 30 within channel 16 by a suitable adhesive or alternative means. The axial opening of element 44 communicates with channel 16 and, more particularly, with entrance portion 46 and an intermediate cylindrical channel portion 47 that has a diameter slightly larger than the inside diameter of element 44. Channel 16 also includes an enlarged portion 48 at the lower end of piece 30. An annular shoulder 49 is thereby formed in channel 16.

A cap or closure 51 fits over the outer surface of piece 30 and engages the bottom of flange 38 so that discharge port 44 and channel 16 are capped while the dispenser is not in use. Preferably, cap 51 is composed of a material similar to that of the housing 14.

Plunger 18 includes an elongate shaft 50 that is slidably received through a central opening 52 in upper end 54 of piece 24. An engagement element 56 is secured to the upper end of shaft 50 and a dispenser section 60 is secured to the lower end of the shaft. Dispenser section 60 is slidably and sealably mounted within cylindrical element 44. More particularly, shaft 50 and dispenser section 60 comprise an integral member 61, shown alone in FIG. 5, that is composed of stainless steel or a similar metallic or plastic substance. The upper end of shaft 50 includes a knurled circumferential section 58 that is received, as shown in FIG. 2, in a central opening 63 of engagement element 56. This provides an interference fit that securely attaches the engagement element to the upper end of shaft 50. The engagement element is preferably composed of a material that is identical or similar to that of housing 14. In alternative embodiments the engagement element and shaft may be integrally interconnected.

As illustrated in FIGS. 2 and 5, dispenser section 60 comprises a generally cylindrical first seal portion 62 formed at the lower end of element 60 and a generally cylindrical second seal portion 64 formed above first seal portion 62. A generally annular, concave receptacle portion 66 is formed between seal portions 62 and 64 to provide dispenser section 60 with a shape that generally resembles an hourglass. Receptacle portion 66 defines an annular space with a dimension for accommodating and carrying a precisely measured amount of powdered substance 28. That amount constitutes a single dosage of the substance to be dispensed by device 10. The surface of receptacle portion 66 is smoothly curved between seal portions 62 and 64 and includes a highly polished mirror finish that prevents the powdered substance 28 from sticking to the surface of the receptacle portion.

As best shown in FIG. 5, member 61 further includes a pair of annular grooves 68 and 70. Upper groove 68 receives a retaining ring or clip 72 in the manner shown in FIGS. 2 and 3. Clip 72 engages the upper end 54 of tubular piece 24 to limit withdrawal of shaft 50 from housing 14 in the direction of arrow 74. Lower groove 70 receives and retains a generally annular agitator 78, shown in FIGS. 2 and 4. Agitator 78 includes a plurality of radial spokes 80 that extend through powdered substance 28. These spokes serve to agitate substance 28 as member 61 is advanced and retracted through chamber 26.

A helical coil spring 80, FIG. 2, is wound about an upper portion of shaft 50 and is disposed between engagement element 56 and upper end 54 of tubular piece 24. More particularly, engagement element 56 includes a generally cylindrical recess 82 formed in its lower end. Tubular housing member 24 likewise includes at its upper end a cylindrical recess 84 that is defined by upper end 54 and the cylindrical side wall of piece 24. Recess 82 is sufficiently large such that the upper end of member 24 is received therein. As a result, recesses 82 and 84 define a space for receiving helical spring 80. The spring is biased to urge engagement element 56 and therefore the entire plunger 18 upwardly in the direction of arrow 74 and into the retracted condition shown in FIG. 2. Retainer clip 72 limits retraction of the plunger. In this condition, first seal portion 62 is sealably engaged with the inner circumference of cylindrical element 44 and second seal portion 64 and receptacle portion 66 are maintained within chamber 26. Spring 80 alternately permits plunger 18 to be depressed in the direction of arrow 90 such that shaft 50 and dispenser section 60 are advanced through chamber 26 until seal portion 62 extends below cylindrical element 44 and seal portion 64 is sealably engaged with the inside circumference of the cylindrical element.

Between uses, dispenser 10 appears as shown in FIG. 2. Spring element 80 urges plunger 18 into the retracted condition so that first seal portion 62 sealably engages the element 44 and the discharge port is closed. As a result, powdered substance 28 is retained securely within chamber 26 and prevented from falling through element 44 and channel 16 extending through insert piece 30. The sealing engagement provided by first seal portion 62 also prevents atmosphere and moisture from entering the chamber and adversely effecting the powdered substance. In this retracted condition, receptacle portion 66 is maintained within chamber 26 such that it collects a single dosage amount of substance 28.

Substance 28 is dispensed from apparatus 10 in the manner shown in FIGS. 1 and 7. In this embodiment, the device is utilized to dispense a powdered chemical reagent for use in the photometric testing of water for desired constituent elements such as chlorine. Initially, cap 51 is removed from piece 30 and enlarged portion 48 is positioned over the opening of cuvette 12, which contains a liquid 94 to be tested using powdered substance 28. Shoulder 49 of piece 30 engages the upper end of the cuvette and enlarged portion 48 surrounds the cuvette so that the cuvette is centered within enlarged portion 48.

With device 10 positioned over the cuvette 12, as shown in FIGS. 1 and 7, the operator 22 presses engagement element 56 of plunger 18 with his thumb. Helical spring 80, FIG. 7, is thereby compressed and shaft 50 and dispenser section 60 are advanced in the direction of arrow 90. Dispenser section 60 slides through cylindrical element 44 such that lower first seal portion 62 extends below element 44 and into intermediate portion 47 of channel 16. Because channel portion 47 has a larger diameter than the inside diameter of element 44, lower seal portion 62 does not sealably engage the walls of portion 47. This causes an annular gap 100 to be formed between dispenser section 60 and the wall of channel portion 47. At the same time, receptacle portion 66, which is carrying a single dosage of reagent 28, is likewise advanced through cylindrical element 44. As a result, when seal portion 62 advances below element 44 and gap 100 is formed, receptacle portion 66 is effectively opened. The single dosage of reagent 28 that is carried by receptacle portion 66 slides along the polished surface of the receptacle and falls through gap 100 and channel 16 into cuvette 12. The reagent is thereby dispensed into test liquid 94 and testing is performed in a known manner.

As seal portion 62 and receptacle portion 66 are advanced, upper seal portion 64 likewise advances into sealing engagement with the inside circumferential surface of cylindrical element 44. Dispenser section 60 is constructed such that seal portion 64 engages element 44 at the same time or before seal portion 62 disengages element 44. As a result, section 60 maintains continuous sealing engagement with the inner circumferential surface of element 44, even when seal portion 62 breaks its engagement with the cylindrical discharge port. This prevents additional reagent 28 from being dispensed from chamber 26 and also seals the chamber against undesired intrusion of air and moisture so that the quality and longevity of the reagent are preserved.

Because receptacle portion 66 includes a generally annular concave shape, reagent is dispensed in a generally annular pattern. If, for example, the substance 28 is dispensed on a table or other flat surface the pattern will resemble that shown in FIG. 8. When the substance is dispensed into a cuvette or liquid container, the precisely measured dosage is dispersed or otherwise mixed into the test liquid and desired testing is then performed in a conventional manner.

After the reagent has been dispensed, operator 22, FIG. 1, simply releases his thumb. Spring 80 then urges plunger 18 to retract in the direction of arrow 74, FIG. 2. As a result, seal portion 64 and receptacle portion 66 are drawn back into chamber 28 and seal portion 62 is retracted back into sealing engagement with cylindrical element 44. Subsequent dosages of reagent may then be dispensed in a similar manner or, if such testing is competed, cap 51 may be replaced over the lower end of the device. The chamber then securely stores the powdered substance for later use.

During both the advancement and retraction of the plunger, agitator element 78, FIGS. 2, 4 and 7, is driven through the remaining reagent 28 in chamber 26 so that the powdered substance does not cling together in clumps and accurate dosages continue to be delivered by the dispenser.

Although use of a cylindrical element 44 in the discharge port is particularly effective, in alternative embodiments, the port may be formed without using such an element. All that is required is a surface in the discharge port that provides a releasable slidable sealing engagement with the plunger. Element 44 may also include non-cylindrical shapes as long as an opening is formed therethrough.

The dispensing device of this invention therefore permits precisely measured dosages of various materials to be dispensed rapidly and reliably. The inconvenience and expense that typically accompany most individual dosage packaging techniques are eliminated. Instead, a very simple, one-handed and virtually error proof operation is exhibited.

Although this invention is disclosed being used for dispensing chemical reagents, such use is not a limitation of this invention. The device may alternatively be utilized to dispense a wide variety of other substances in granular, powdered, liquid and other forms.

Although specific features of the invention are shown in some drawings and not in others, this is for convenience only, as each of the features may be combined with any or all of the other features in accordance with the invention.

Other embodiments will occur to those skilled in the art and are within the following claims:

What is claimed is:

1. A single dosage substance dispenser comprising:
   a housing having a chamber formed therein for holding a substance to be dispensed and a discharge port that communicates with said chamber;
   a plunger slidably mounted to said housing for extending through said chamber and into said discharge port, said plunger including a first seal portion proximate a lower end thereof, a second seal portion disposed above said first seal portion and a receptacle portion located between said first and second seal portions for accommodating a single dosage of said substance to be dispensed; said first and second seal portions being sealably and slidably engageable with said discharge port, said receptacle portion including a generally annular concave surface that is smoothly curved between said first and second seal portions and has a polished surface; and
   spring means for urging said plunger to retract so that said first seal portion engages said discharge port and said receptacle portion is maintained in said chamber to collect said single dosage therefrom and for permitting said plunger to be advanced so that said second seal portion engages said discharge port and said receptacle portion is driven beyond said discharge port to dispense said single dosage collected from said chamber.

2. The dispenser of claim 1 in which said housing has a generally cylindrical shape.

3. The dispenser of claim 1 in which said plunger includes an engagement portion and an elongate shaft having an upper section that is attached to said engagement portion and a lower section for carrying said first and second seal portions and said receptacle portion.

4. The dispenser of claim 3 in which said spring means include a helical compression spring disposed about said shaft and extending between said housing and said engagement portion of said plunger.

5. The dispenser of claim 3 further including a stop element attached to said shaft portion within said chamber for restricting removal of said plunger from said housing.

6. The dispenser of claim 1 in which said housing includes a channel extended below and in communication with said discharge port and being wider than said discharge port.

7. The dispenser of claim 6 in which said discharge port includes a substantially cylindrical element that communicates with said channel and has an inside diameter that is smaller than that of said channel.

8. The dispenser of claim 6 in which said channel includes an enlarged portion for engaging a holder of a test liquid and centering said discharge port over said holder.

9. The dispenser of claim 1 in which said first and second seal portions and said receptacle portion are integrally interconnected.

10. The dispenser of claim 1 in which said first and second seal portions have substantially cylindrical outer surfaces.

11. The dispenser of claim 1 further including an agitator element attached to said plunger within said chamber for agitating said substance therein as said plunger is retracted and advanced in said chamber.

12. The dispenser of claim 1 further including a closure that is selectively engaged with said housing to cover said discharge port.

* * * * *